United States Patent [19]

Kaplan et al.

[11] 4,422,656
[45] Dec. 27, 1983

[54] APPARATUS FOR MANUAL ROTATION OF MOTOR VEHICLE DRIVING WHEELS THROUGH PROPELLER SHAFT AND DIFFERENTIAL

[75] Inventors: James H. Kaplan, Mission Hills; Joel S. Lissauer, Overland Park, both of Kans.

[73] Assignee: Harlan Material Handling Corporation, Kansas City, Kans.

[21] Appl. No.: 376,539

[22] Filed: May 10, 1982

[51] Int. Cl.³ .............................................. B60K 9/00
[52] U.S. Cl. ...................................... 280/3; 74/15.88; 180/207; 192/67 R
[58] Field of Search .................... 180/205, 207; 280/3; 74/15.88; 192/67 R

[56] References Cited

U.S. PATENT DOCUMENTS

| | | | |
|---|---|---|---|
| 1,517,230 | 11/1924 | Ferrin | 74/6 |
| 1,858,700 | 5/1932 | Besonson | 192/48.8 |
| 2,555,593 | 6/1951 | Lee | 192/67 R |
| 2,623,393 | 12/1952 | Morrison | 74/6 |
| 3,209,604 | 10/1965 | Mitchell et al. | 74/15.63 |
| 3,395,588 | 8/1968 | Bleigh et al. | 74/405 |

Primary Examiner—John A. Pekar
Assistant Examiner—D. Lynn Fugate
Attorney, Agent, or Firm—Schmidt, Johnson, Hovey & Williams

[57] ABSTRACT

Apparatus for advancing or reversing motor vehicles, such as tractors to be coupled with trailers, through use of a hand crank, transmits power from a belt and pulley assembly to the vehicle propeller shaft, and therefore, to the drive wheels through the differential and wheel axle. Axially aligned, housing-supported input and output spindles are interposed between such assembly and the crank, the spring-loaded input spindle being shiftable by operation of the crank to a position where it operably connects with the output spindle.

9 Claims, 5 Drawing Figures

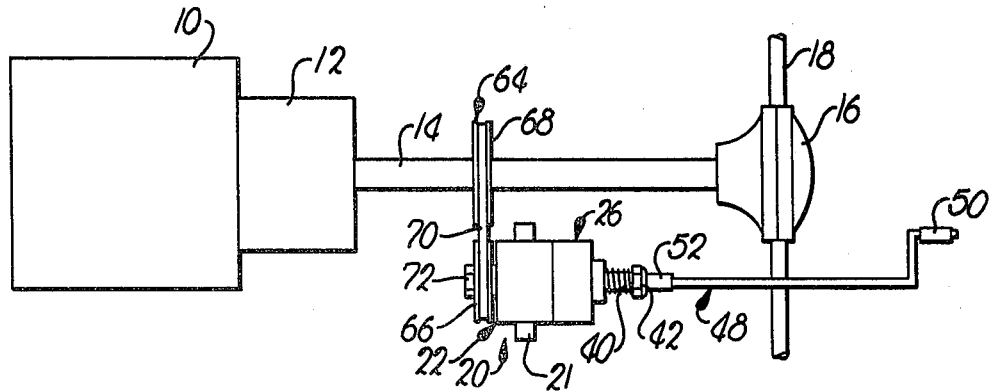
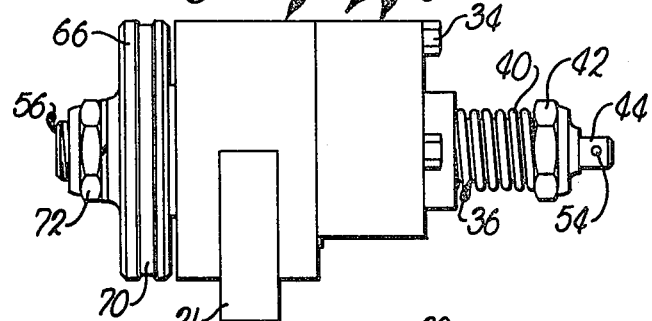
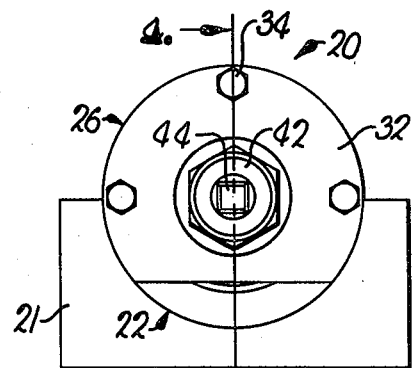
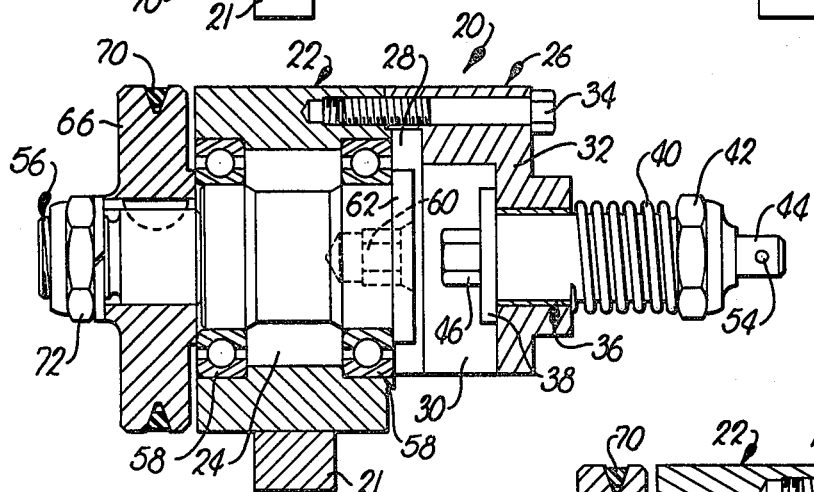
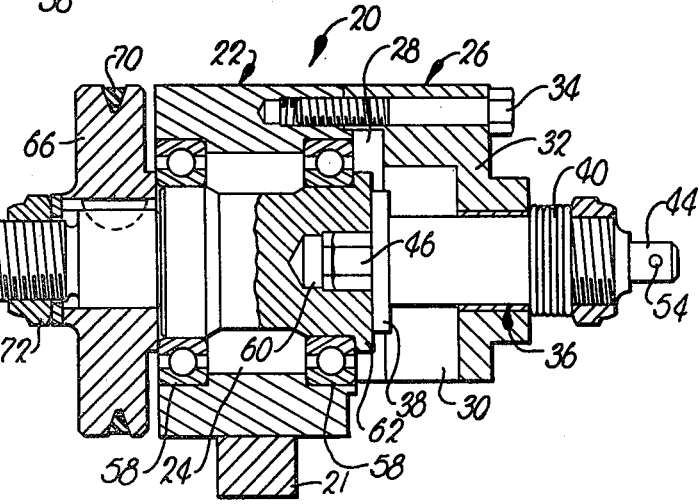

APPARATUS FOR MANUAL ROTATION OF MOTOR VEHICLE DRIVING WHEELS THROUGH PROPELLER SHAFT AND DIFFERENTIAL

Repetitive coupling and decoupling of tractors and trailers, as for example, carriers of luggage and cargo at airports, is a daily, time-consuming, aggravating task usually requiring extra help to assist the tractor operator in guiding the tractor in order to permit manuevering of the tractor into proper position aligning the tow bar with the trailer tongue.

To solve the problem we have provided for manual movement of the tractor by the operator without need to use the engine such that, with the requirement of but a small amount of physical energy the tractor may be advanced or reversed into position relative to the trailer in a short period of time.

Our advantageous results are made possible through use of a readily-accessible hand crank to power the propeller shaft, the differential gearing, the power axle and the drive wheels of the tractor while the transmission is in neutral and the engine either idling or shut off.

A belt and pulley assembly is operably associated with the propeller shaft and an output spindle, and the latter is, in turn, rotated by a spring-loaded input spindle interposed between the crank and the output spindle. The input spindle may be shifted by the crank in order to interconnect the spindles before the crank is rotated.

IN THE DRAWING

FIG. 1 is a schematic view of certain conventional parts of a motor vehicle showing the apparatus of our present invention associated therewith;

FIG. 2 is an enlarged, side elevational view of the housing of such apparatus and of certain parts associated therewith;

FIG. 3 is an end view of the unit shown in FIG. 2;

FIG. 4 is a cross-sectional view, still further enlarged, taken on line 4—4 of FIG. 3; and FIG. 5 is a view similar to FIG. 4 but with the spindles interconnected.

In FIG. 1 of the drawing, the engine, transmission, propeller shaft, differential and rear axle of a mobile vehicle, such as a tractor, are represented by the numerals 10, 12, 14, 16 and 18 respectively, it being understood that the axle 18 is provided with drive wheels (not shown).

In accordance with our present invention, a support 20 has a suitable bracket 21 adapting the same for connection to the chassis of the vehicle. The support 20 is in the nature of a housing provided with a section 22 having a bore 24, and a section 26 having a pair of cavities 28 and 30 and an end wall 32, the sections 22 and 26 being clamped together by releasable fasteners 34.

A rotatable input spindle 36 extending through the wall 32 has an integral shoulder 38 normally held against the inner face of the wall 32 within the cavity 30 by a spring 40 coiled about the spindle 36 between the wall 32 and a stop nut 42 on the spindle 36. Transversely, polygonal plugs 44 and 46 are provided on the ends of the spindle 36.

A crank 48, adapted to be carried by the vehicle chassis, has an outer handle 50 and an inner socket member 52 adapted to releasably receive and mate with the plug 44 over a spring-loaded ball 54 carried by the plug 44, it being understood that one or more universal joints (not shown) may be interposed in the crank 48.

An output spindle 56 rotatably supported in axial alignment with the spindle 36 by a pair of spaced bearings 58 mounted in the bore 24, has a socket member 60 at its inner end adapted to receive and mate with the plug 46, and a flange 62 within the cavity 28 is provided on the spindle 56.

Means for transmitting power from the output spindle 56 to the shaft 14 is in the nature of a belt and pulley assembly 64 which includes a pulley 66 keyed to the spindle 56 exteriorly of the housing 20, a larger pulley 68 secured to the shaft 14 and a belt 70 between the pulleys 66 and 68. A nut 72 on the spindle 56 clamps the inner races of the bearings 58 between the flange 62 and the hub of the pulley 66.

OPERATION

With the transmission 12 in neutral and the engine 10 either idling or shut off, an operator standing near the handle 50 may shift the crank 48, and therefore, the spindle 36 against the action of the spring 40 from the position shown in FIGS. 1-4 to the position illustrated in FIG. 5. This moves the shoulder 38 away from the wall 32 into engagement with the spindle 56 and engages the plug 46 within the socket 60.

The vehicle may then be advanced or reversed by use of the handle 50 to rotate the crank 48, the spindles 36 and 56 and the pulley 66 to transmit rotative power to the pulley 68 from the belt 70. Hence, the drive wheels of the vehicle are driven from the shaft 14 through the differential 16 and axle 18 at such speeds and in such increments as may be desired or needed to couple the vehicle with a trailer or for other purposes.

The power advantage made possible in the assembly 64 by the differential in pulley diameters makes the turning of the crank 48 an extremely easy task. Upon release of the handle 50, the spindle 36 returns automatically to the position shown in FIG. 4 by the force of the spring 40 acting between the wall 32 and the nut 42.

We claim:

1. Apparatus for facilitating the hitching of a towable vehicle to a towing vehicle behind the latter upon manual rotation of the drive wheels of the towing vehicle through its propeller shaft and differential by a single operator standing on the ground behind the towing vehicle, said apparatus comprising:

a support adapted for connection to the chassis of said vehicle;

an input spindle rotatably carried by said support;

an ouput spindle rotatably carried by said support in axial alignment with the input spindle;

means for transmitting power from said output spindle to said shaft, the input spindle being shiftable along its axis of rotation relative to the support toward and away from the output spindle;

resilient means yieldably biasing the input spindle away from the output spindle;

means for interconnecting the spindles when the input spindle is shifted toward the output spindle against the action of said resilient means whereby, upon rotation of the input spindle to rotate the output spindle, the shaft is rotated through said power transmitting means; and a manually operable crank extending rearwardly from said towing vehicle to a point accessible to said operator and having means of connection with the input spindle for rotating the latter, said interconnecting means being releasable to prevent rotation of the input shaft and crank while the propeller shaft is being rotated during normal operation of the towing vehicle.

2. The invention of claim 1, said means of connection being a releasable, transversely polygonal plug and socket coupling in mating relationship when the plug is within the socket.

3. The invention of claim 1, said interconnecting means being a transversely polygonal plug and socket coupling in mating relationship when the plug is within the socket.

4. The invention of claim 1, said power transmitting means being a first pulley secured to the output spindle, a second pulley secured to said shaft and a continuous belt trained over the pulleys, the second pulley having a diameter larger than the diameter of the first pulley for providing a power advantage to said operator during operation of said crank.

5. The invention of claim 4, said support being a housing having the output spindle rotatably mounted therein, said output spindle extending outwardly beyond one end of the housing and having said first pulley secured thereto exteriorly of the housing adjacent said one end of the latter.

6. The invention of claim 5, a flange on the output spindle within the housing; a pair of spaced bearings in the housing for the output spindle each having an inner race; and means clamping the races between the first pulley and said flange.

7. The invention of claim 6, said housing having a wall opposite to said one end thereof, the input spindle extending through the wall and having a shoulder engageable with the wall for limiting the extent of outward movement of the input spindle under influence of said resilient means.

8. The invention of claim 5, said input spindle having a stop exteriorly of the housing, said resilient means being a spring coiled on the input spindle between said wall and said stop.

9. The invention of claim 8, said shoulder being disposed to abut the flange when the spindles are interconnected.

* * * * *